Patented Oct. 15, 1935

2,017,572

UNITED STATES PATENT OFFICE 2,017,572

PROCESS FOR THE MANUFACTURE OF SOLVENTS

James M. Sherman, Ithaca, N. Y., and Norris M. Erb, Pasadena, Md., assignors to U. S. Industrial Alcohol Co., New York, N. Y., a corporation of West Virginia No Drawing. Application October 1, 1932, Serial No. 635,862

12 Claims. (Cl. 260—135)

Our invention relates to the manufacture of solvents, especially higher alcohols, by a fermentation process, to be followed by separation of the solvents from the fermented mixture, this separation being accomplished by ordinary procedure and being, per se, no part of the novelty of the invention. The solvents obtained by the particular process described herein are butyl and isopropyl alcohol, with a minor proportion of acetone. The invention is applicable to the production of solvents from cane molasses, as a cheap material, provided that the sucrose of the molasses is first inverted or hydrolyzed to resolve it into hexose sugars.

The object is to obtain good yields of solvents by a simple and readily controllable fermentation process, necessitating a minimum outlay in plant equipment and not requiring the addition of expensive nutrients at any stage of the process.

We have found that by the proper application of cultures of a certain type or species of microorganism, not hitherto employed for this purpose, or previously isolated as far as we are aware, the stated solvents can be produced with particular success from inverted molasses mashes or other hexose sugar solutions.

The organism, which we have named Clostridium viscifaciens, is an anaerobe. It is a small motile rod with sub-terminal to central spores, and its vegetative cells stain readily with ordinary dyes such as methylene blue and gentian violet. Being an anaerobe, it shows no growth on agar slants. It does not liquefy gelatine. There is no curdling or proteolysis of milk by this organism. Whereas solvents can be obtained with the cultures from maltose and from hexose sugars, they are not produced in appreciable quantities from lactose, sucrose, dextrin, starch, glycerol, or salicin. Solvents are not obtained from starchy materials, though, of course, starch may be hydrolyzed to form hexose sugars for the purpose of this process.

Among other advantages of our process is that, with this organism, it is possible to operate with mashes relatively high in hexose sugar. For example, a concentration of sugar of 6.2 grams per 100 cubic centimeters of mash can be fermented, in practical operation, to give a weight of total solvents equivalent to 28% of the weight of sugar in the mash.

The approximate proportions of the solvents obtained are 66 parts of butyl alcohol, 31 parts of isopropyl alcohol and 3 parts of acetone.

The following is a full description of the microorganism employed in the process:

Clostridium viscifaciens

*Form.*—Motile, spore-forming rod.

*Size.*—About 1 micron in diameter by 3 to 10 microns in length. Average length about 6 microns. (As is true of all bacteria, the size varies somewhat with age of culture, type of medium, and other conditions of growth.)

*Staining reactions.*—Gram negative; blue granules with iodine; stains readily with ordinary bacteriological dyes such as methylene blue and gentian violet.

*Endospores.*—Oval in shape; about 1 x 2 microns in size.

*Position of spores in cell.*—Subterminal to central.

*Sporangia.*—Cells containing spores usually not markedly swollen. Sometimes the sporangia are swollen, giving rise to club-like and spindle-shaped cells.

*Relation to oxygen.*—Anaerobic. (This organism would be classed as an obligate anaerobe according to ordinary laboratory criteria.)

*Nutrient agar slant culture.*—No visible growth.

*Nutrient agar stab culture.*—No visible growth.

*Liquid media.*—Tendency toward flocculent growth.

*Gelatin.*—Not liquefied.

*Milk.*—Acid produced; not curdled; casein not digested.

*Indol.*—Not produced.

*Ammonia.*—Produced from "peptone".

*Hydrogen sulphide.*—Not produced from proteins or "peptone".

*Nitrates.*—Reduced to nitrites.

*Sulphates.*—Not reduced to hydrogen sulphide.

*Synthetic media.*—Growth takes place in synthetic media containing inorganic nitrogen, with glucose as the source of energy.

*Nitrogen-free media.*—No growth.

*Limiting acidity for growth.*—About pH 4.0.

*Limiting alkalinity for growth.*—About pH 8.0. (These limits are much beyond those suitable for active fermentation.)

*Maximum temperature for growth.*—About 43° C. (Growth at 42.5° C.; no growth at 45° C.)

*Minimum temperature for growth.*—About 15° C.

*Optimum temperature for growth.*—32–36° C.

*Limiting glucose concentration for growth.*—About 15%.

*Glucose broth.*—Acid, gas and alcohols.

*Maltose broth.*—Acid, gas and alcohols.

*Sucrose broth.*—Acid and gas.

*Lactose broth.*—Acid and gas.

*Dextrin broth.*—Acid and gas.

*Starch broth.*—Acid and gas.

*Glycerol broth.*—Acid and gas.

*Mannitol broth.*—Acid and gas.

*Salicin broth.*—Acid and gas.

*Corn meal mash.*—No solvents produced; not digested.

*Calcium lactate broth.*—No solvents produced.

*Molasses mash.*—Solvents production poor.

*Hydrolyzed molasses mash.*—Solvents production good.

*Ratio of solvents produced in hydrolyzed molasses mash.*—Butyl alcohol 66 parts, isopropyl alcohol 31 parts, acetone 3 parts.

An advantage of the process is that it is well adapted for the manufacture of the solvents from an inexpensive and abundant carbohydrate material. Various processes have been patented or described for utilizing molasses as a material from which to make butyl alcohol and acetone, or butyl and isopropyl alcohols and acetone, by fermentation, but the material has hitherto presented difficulties which have stood in the way of large-scale production of solvents from this source. These difficulties have arisen principally from the fact that molasses is poor in nitrogen, especially protein nitrogen, and that it is difficult to sterilize without the formation of toxic products.

We have been able to conduct butyl-isopropyl fermentation in molasses successfully on a commercial scale with cultures of the herein described organism, and have further found it to be sufficiently resistant to the non-nutrient elements of molasses to be able to produce good yields in a relatively concentrated mash. The nitrogen deficiency of the molasses mash may be supplied by ammonium salts and the organism is not affected by toxins in the molasses provided the material is sterilized by our preferred method herein described.

In nature the organism is found primarily in the soil, but may be obtained also from grain or elsewhere on material which has been in contact with soil. It is, of course, associated in nature with other organisms and the culture must be obtained from the sources mentioned by means of an appropriate isolation method. We have found it important, or at least highly desirable, to isolate the organism in inverted molasses solutions, to which have been added ammonium salts to supply nitrogenous food. By doing this, cultures are obtained which are well adapted for fermenting molasses mashes, and which are also capable of utilizing simple nitrogen compounds in the form of ammonium salts and, therefore, do not require the addition of expensive nitrogenous food, such as protein, to the mashes. Otherwise, the isolation and cultivation of the organism may be effected by various ordinary techniques of the bacteriological laboratory. The micro-organism may be isolated by using other hexose sugar solutions in place of the hydrolyzed molasses solution.

By-product molasses contains micro-organisms which are highly resistant to heat, and since fermentation must be carried out aseptically, or virtually so, it is often necessary to heat mashes made from it for such a length of time and at such temperatures that toxic products are formed. These products render it unfit for use in fermentations of this kind, especially as the molasses contains some toxic compounds which were formed as a result of heating in the sugar house. We have discovered that the toxicity of molasses to solvent-producing organisms can be eliminated and the sterilization time and temperature considerably reduced if the partly diluted molasses or molasses mash is heated in the presence of sufficient acid to invert the sucrose contained in such molasses, and then quickly diluted to the desired concentration with cold sterile water before adding the basic constituents of the mash.

A property of Clostridium viscifaciens which makes it especially suitable for the fermentation of inverted molasses mashes or hexose sugar mashes is the ability of cultures or seedings of these micro-organisms to form flocs or masses throughout the mash. Molasses mashes and other mashes may be lacking in solids. Generally speaking, anaerobes do not grow well in clear liquid media or in those where there are few solid particles in suspension. We have discovered that when seedings of Clostridium viscifaciens are added to sterile hexose sugar mashes such as inverted molasses mashes prepared by our preferred method, the micro-organisms will grow and ferment the medium in such a way as to give rise to a copious flocculent solid subtrate which distributes itself throughout the mash and is kept in motion by the evolution of gas. This flocculum carries with it all the other solid portions of the mash such as chalk used for neutralizing excess acidity, and protein particles, and insures optimum fermentation conditions throughout the medium. We have found that when this flocculating tendency is lacking, these other solid ingredients settle out of the mash and yields of solvents result which are considerably lower or are inadequate for successful commercial operation. Clostridium viscifaciens thus has the property of creating by its manner of growth certain conditions very favorable to the production of solvents from sugar solutions.

For best results, the preparation of the mash to be fermented for the production of solvents is carried out in two principal steps, namely sterilization and cooling of the mash, followed by addition of ammonia and chalk, the ammonia as a source of nitrogenous food and as a nuetralizer for the acid, and the chalk to adjust the acidity and act as a buffer.

We prefer to sterilize and invert the sucrose in a single operation by heating the molasses with an acid, preferably sulfuric. In this way, the conditions are excellent for killing foreign organisms, and at the same time the volume treated is kept down. This latter feature makes it possible then to cool the sterile, inverted molasses by the addition of cold, sterile water, thus effecting the necessary cooling and dilution in one step, the advantage of which is the elimination of mash-cooling apparatus which is costly to build and operate and which constitutes a standing infection hazard on the bacteriological side. Advantage will be realized, however, even though some cooling in the ordinary way might be resorted to.

The heating of the mash in an acid condition thus serves a triple purpose. It aids in obtaining complete or adequate sterilization, it inverts the sucrose, and it avoids formation of toxic materials produced when molasses is heated with basic substances such as ammonia, calcium carbonate, etc.

The cold water used for cooling and diluting the mash may be sterilized, or rendered substantially sterile, beforehand by any of the known means of sterilizing water, such as ultra-violet light, ozone or chlorine. We prefer to use the last-named, but in order that fermentation be successful, we have found it necessary to add an excessive amount of chlorine as compared with ordinary water-sterilizing practice. Satisfactory results can be had if enough chlorine is added to the water to give a residual of about 15-20 parts of free chlorine per million in the water used for dilution. On the other hand, the amount of free residual chlorine must not be too great (preferably not above 30 parts per million) or the solvent-producing micro-organisms will be injuriously affected when later added.

After the molasses has been sterilized, cooled and diluted, the ammonia and chalk are added. The ammonia neutralizes the acid in part and forms ammonium sulfate or other ammonium salt, depending upon the acid used for inversion, this salt providing nitrogenous food for the organism. Following the addition of the ammonia, a sterile slurry of chalk is added in such amount as to complete the adjustment of the mash to the required acidity, which is a pH between about 5.5 and 6.5. Although we prefer the use of chalk, we do not limit ourselves to its use as other basic materials which would give the same effect as chalk are applicable to this fermentation.

The mash is then ready for the addition of a culture of the micro-organisms and for the ensuing fermentation operation.

The following is given as a concrete example:

To 5950 lbs. of cane molasses, we add a volume of water approximately equal to that of the molasses. This partly diluted material is run into a pressure vessel and 12 gallons of 60° Bé. sulphuric acid is added. The mixture is heated for ½ hour at 15 lbs. pressure by direct steaming. The vessel is then blown down to atmospheric pressure and cold water is added which has been chlorinated so as to contain about 15 parts per million of residual chlorine. Sufficient water is used to bring the sugar concentration to the desired point which is about 6.2 gms. invert sugar per 100 cubic centimeters of mash. 12 gallons of 26° ammonia is then run into the vessel and a slurry of chalk, sterilized in a separate vessel, is run into the main vessel. This slurry will contain about 150 lbs. of chalk if typical blackstrap is being fermented. The pH at this point should be about 6.0, or between about 5.5 and 6.5. The temperature is set at about 93° F. by heating or cooling slightly as may be necessary and the mash is seeded from a seed mash of Clostridium viscifaciens previously prepared. During fermentation, the temperature is maintained between 88° and 95° F. When the fermentation step is complete, the beer is distilled in an appropriate manner.

A culture of Clostridium viscifaciens used as seed in a mash of the type described will give satisfactory fermentations and result in the production of solvents of the kind and in the quantities stated, provided care is taken to keep it in such a condition that it gives rise to flocs or masses throughout the medium at a certain phase of its cycle. This may be insured in the following ways:

Storage of stock culture in spore state on a low sugar, high protein medium, such as meat.

Heat shocking this stock culture by addition to a hot hydrolyzed molasses mash containing particulate matter.

Employing young vegetative cultures in subsequent seed stages.

The use of a final mash prepared so that its physical and chemical nature will favor flocculation as herein described.

We claim:

1. A process of producing solvents, consisting principally of butyl alcohol and isopropyl alcohol, by fermentation, which comprises preparing a sterilized, inverted molasses mash, adding thereto a culture of the herein-described micro-organism, Clostridium viscifaciens, and conducting the fermentation caused by said micro-organism.

2. A process of producing solvents, consisting principally of butyl alcohol and isopropyl alcohol, by fermentation, which comprises preparing a sugar mash, the sugar of the mash being of the group composed of maltose and hexose sugars, adding thereto a culture of the herein-described micro-organism, Clostridium viscifaciens, and conducting the fermentation caused by said micro-organism.

3. A process of producing solvents by the fermentation of a hexose sugar mash by means of a culture of the herein-described micro-organism Clostridium viscifaciens.

4. A process of producing solvents, consisting principally of butyl alcohol and isopropyl alcohol, which comprises preparing a sterilized, inverted molasses mash, adding basic ingredients adapted to furnish available nitrogen and to adjust the acidity of the mash, and fermenting the mash with a culture of the herein described micro-organism Clostridium viscifaciens, the molasses being heated for the sterilization and inversion and then cooled before the basic ingredients are added.

5. A process of producing solvents, consisting principally of butyl alcohol and isopropyl alcohol which comprises diluting molasses with water, heating the diluted molasses in the presence of sufficient acid to invert the sucrose contained in the molasses, cooling the mash, thereafter adding basic ingredients adapted to furnish available nitrogen and to adjust the acidity of the mash, then seeding the mash with a culture of the herein described micro-organism Clostridium viscifaciens, and conducting the fermentation caused by said micro-organism.

6. A process of producing solvents, consisting principally of butyl alcohol and isopropyl alcohol, which comprises partly diluting molasses with water, heating the partly diluted molasses in the presence of sufficient acid to invert the sucrose contained in the molasses, then cooling and diluting the mash by adding sufficient cold sterile water to give a sugar concentration between 5.5 and 6.5 gms. invert sugar per 100 cubic centimeters of mash, then adding basic ingredients adapted to furnish available nitrogen and to adjust the acidity of the mash, then seeding the mash with a culture of the herein described micro-organism Clostridium viscifaciens, and conducting the fermentation caused by said micro-organism.

7. A process of producing solvents by the fermentation of a sugar mash, the sugar of which is of the group composed of maltose and hexose sugars, by means of a flocculating culture of the herein described micro-organism, Clostridium viscifaciens.

8. A process of producing solvents as set forth in claim 7, in which the seed culture added to the mash is derived from a culture that has been stored in spore state on a low sugar, high protein medium.

9. A process of producing solvents as set forth in claim 7, in which the seed culture added to the mash is derived from a culture that has been stored in spore state on a low sugar, high protein medium and has been heat-shocked by addition to a hot sugar medium containing particulate matter.

10. A process of producing solvents as set forth in claim 7, in which the seed culture added to the mash is a young vegetative culture.

11. A process of producing solvents as set forth in claim 7, in which the seed culture added to the mash is derived from a stock culture that has been heat-shocked by addition to a hot sugar medium containing particulate matter.

12. A process of producing solvents by the fermentation of a sterilized, inverted molasses mash by means of a culture of the herein-described micro-organism Clostridium viscifaciens, said culture being derived from a culture that has been stored in spore state on a low-sugar, high protein medium and has been heat-shocked by addition to a hot hydrolyzed molasses medium containing particulate matter.

JAMES M. SHERMAN.
NORRIS M. ERB.